(12) United States Patent
Zhuang et al.

(10) Patent No.: US 7,573,805 B2
(45) Date of Patent: Aug. 11, 2009

(54) DATA TRANSMISSION AND RECEPTION METHOD AND APPARATUS

(75) Inventors: Xiangyang Zhuang, Hoffman Estates, IL (US); Frederick W. Vook, Schaumburg, IL (US); Timothy A. Thomas, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 1650 days.

(21) Appl. No.: 10/035,027

(22) Filed: Dec. 28, 2001

(65) Prior Publication Data
US 2003/0123381 A1 Jul. 3, 2003

(51) Int. Cl.
*H04J 11/00* (2006.01)

(52) U.S. Cl. .................. 370/208; 370/209; 370/210

(58) Field of Classification Search ......... 370/208–210, 370/203, 204, 206, 480, 481, 482, 310, 319, 370/329, 343, 344; 375/267; 455/92; 714/746
See application file for complete search history.

(56) References Cited

U.S. PATENT DOCUMENTS

| | | | | |
|---|---|---|---|---|
| 6,144,711 A * | 11/2000 | Raleigh et al. | ............... | 375/347 |
| 6,188,717 B1 * | 2/2001 | Kaiser et al. | ................ | 375/148 |
| 6,285,720 B1 * | 9/2001 | Martone | ..................... | 375/262 |
| 6,377,631 B1 * | 4/2002 | Raleigh | ..................... | 375/299 |
| 6,377,636 B1 | 4/2002 | Paulraj et al. | | |
| 6,452,981 B1 * | 9/2002 | Raleigh et al. | ............... | 375/299 |
| 6,590,532 B1 * | 7/2003 | Ogawa et al. | ............... | 342/378 |
| 6,603,806 B2 * | 8/2003 | Martone | ..................... | 375/219 |
| 6,747,948 B1 * | 6/2004 | Sarraf et al. | ................ | 370/210 |
| 6,757,348 B1 * | 6/2004 | Vila et al. | .................... | 375/372 |
| 6,771,706 B2 * | 8/2004 | Ling et al. | ................... | 375/267 |
| 6,850,481 B2 * | 2/2005 | Wu et al. | ..................... | 370/208 |
| 6,888,899 B2 * | 5/2005 | Raleigh et al. | ............... | 375/299 |
| 6,901,550 B2 * | 5/2005 | Adar et al. | ................... | 714/762 |
| 6,961,388 B2 * | 11/2005 | Ling et al. | ................... | 375/267 |
| 7,010,053 B2 * | 3/2006 | El-Gamal et al. | ........... | 375/267 |
| 7,145,971 B2 * | 12/2006 | Raleigh et al. | ............... | 375/347 |
| 7,203,249 B2 * | 4/2007 | Raleigh et al. | ............... | 375/299 |
| 2002/0122381 A1 * | 9/2002 | Wu et al. | ..................... | 370/208 |
| 2002/0191703 A1 * | 12/2002 | Ling et al. | ................... | 375/267 |
| 2003/0003880 A1 * | 1/2003 | Ling et al. | ..................... | 455/92 |
| 2003/0072254 A1 * | 4/2003 | Ma et al. | ..................... | 370/208 |
| 2003/0072382 A1 * | 4/2003 | Raleigh et al. | ............... | 375/267 |
| 2003/0074625 A1 * | 4/2003 | Adar et al. | ................... | 714/752 |
| 2003/0112745 A1 * | 6/2003 | Zhuang et al. | .............. | 370/208 |
| 2005/0157810 A1 * | 7/2005 | Raleigh et al. | ............... | 375/267 |

(Continued)

OTHER PUBLICATIONS

Benedetto, S., et al., "Serial Concatenation of Interleaved Codes: Performance Analysis, Design and Iterative Decoding," TDA Progress Report 42-126, pp. 1-26 (1996).

(Continued)

*Primary Examiner*—Ayaz R Sheikh
*Assistant Examiner*—Chuong T Ho

(57) ABSTRACT

A datastream of bits (which may itself be comprised of a plurality of datastreams as derived from a plurality of sources) are coded (21) and then interleaved (12) across a plurality of transmitters (25 and 26) and a plurality of subcarriers (27) as supported and shared by the transmitters. If desired, the bits can be mapped to corresponding symbols prior to transmission. The resultant information is transmitted simultaneously by the transmitters using the shared channel of subcarriers. Upon reception, the received signals are de-interleaved and decoded to recover the original datastream for each sources.

13 Claims, 2 Drawing Sheets

U.S. PATENT DOCUMENTS

| | | | |
|---|---|---|---|
| 2005/0195915 A1* | 9/2005 | Raleigh et al. | 375/267 |
| 2005/0213670 A1* | 9/2005 | Wei | 375/254 |
| 2005/0213671 A1* | 9/2005 | Wei | 375/254 |
| 2007/0019754 A1* | 1/2007 | Raleigh et al. | 375/260 |
| 2007/0140374 A1* | 6/2007 | Raleigh et al. | 375/267 |

OTHER PUBLICATIONS

Benedetto, S., et al., "*A Soft-Input Soft-Output Maximum A Posteriori (MAP) Module to Decode Parallel and Serial Concatenated Codes*," TDA Progress Report 42-127, pp. 1-20 (1996).

Alamauti, S., "*A Simple Transmit Diversity Technique for Wireless Communications*," IEEE Journal on Select Areas in Communications, pp. 1451-1458 (1998).

Foschini, G.J. et al., "*On Limits of Wireless Communications in a Fading Environment when Using Multiple Antennas*," pp. 311-335 (1998).

Bölcskei, J., et al., "*On the Capacity of OFDM-Based Multi-Antenna Systems*," IEEE pp. 2569-2572 (2000).

Batarieve, M.D., et al., "*An Experimental OFDM System for Broadband Mobile Communications*," IEEE pp. 1947-1051 (2001).

* cited by examiner

DATA TRANSMISSION AND RECEPTION METHOD AND APPARATUS

TECHNICAL FIELD

This invention relates generally to data transmission and reception methods and apparatus, and more particularly to broadband wireless transmission and reception using multiple-input multiple-output modulation.

BACKGROUND

Wireless communications systems of various kinds are well understood in the art. Orthogonal frequency division multiplexing (OFDM) is a particular way to support high data rate broadband systems that operate in a multipath environment. This approach divides a radio frequency channel into several narrower bandwidth subcarriers and transmits data simultaneously on each subcarrier. Meanwhile, multiple-input multiple-output techniques allow simultaneous transmission of different data streams from multiple antennas over the same frequency band, thus increasing the spectral efficiency significantly. Combining orthogonal frequency division multiplexing with multiple-input multiple-output techniques offers great practical potential to provide very high data rate wireless services. Unfortunately, present orthogonal frequency division multiplexing and multiple-input multiple-output (MIMO) techniques do not describe a complete system design that will readily support such a combination, and in particular do not address a link-level design that will support a compatible combination of such techniques.

A need therefore exists for a way to at least partially meet such requirements. Any such improvement should be efficient in operation, relatively inexpensive, and effective.

BRIEF DESCRIPTION OF THE DRAWINGS

These needs and others are substantially met through provision of the transmission and reception apparatus and methods described herein. These benefits and others will become more clear upon making a thorough review and study of the following detailed description, particularly when studied in conjunction with the drawings, wherein.

DETAILED DESCRIPTION

Viewed generally, pursuant to various embodiments described below, a datastream of bits is bit-interleaved over a plurality of orthogonal frequency division multiplexed transmitters, including over the subcarriers supported by those transmitters. Information that corresponds to those interleaved bits are then transmitted over those subcarriers by those transmitters. In a preferred embodiment, the bits are interleaved over transmitters and subcarriers such that consecutive bits as originally provided and as ultimately transmitted using these transmission resources will be transmitted on subcarriers and transmitters that have substantially minimal correlation. The datastream itself can be comprised of information from a single source or from a plurality of difference sources. The datastream bits can be encoded if desired and when the datastream is comprised of bits from multiple sources, the bits from each source can be encoded in different ways as appropriate or desired. If desired, the transmission resources can further include multiple antennas for each transmitter (in such an embodiment, of course, the transmitter must include a corresponding circuit chain for each such antenna; though one might view such an arrangement as constituting a plurality of transmitters, for purposes of this description such a configuration can be viewed as "a" transmitter), and the bits can then be interleaved over the transmitters, the antennas, and the subcarriers.

Figure 1:
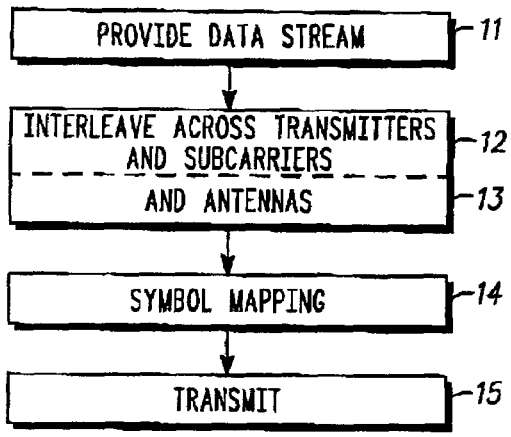
FIG. 1 comprises a flow diagram in accordance with various embodiments of the invention.

Referring now to FIG. 1, a datastream of bits is provided 11 and interleaved 12 across two or more transmitters and the subcarriers supported by those transmitters. For example, if there are two such transmitters and a total of three subcarriers supported by the system, then the first transmitter will transmit on those three subcarriers and the second transmitter will simultaneously transmit on those three subcarriers. So configured, a given bit stream can be interleaved by assigning each bit to a particular subcarrier and a particular transmitter. (If desired, and where the transmitters are themselves inclusive of multiple antennas and their corresponding circuit chains, this interleaving activity can also effect interleaving 13 over the multiple antenna choices as well). If desired, these bits as interleaved over these resources can be mapped 14 to corresponding symbols in accordance with well understood prior art techniques to achieve greater data throughput. These symbols (or the bits themselves when no symbol mapping is provided) are then transmitted 15 using the corresponding subcarrier and transmitter (and antenna). When transmitting, each of the transmitters uses the same channel and corresponding subcarriers simultaneously but importantly, each transmitter broadcasts different information when using these subcarriers. Additional details and alternatives are presented below.

Figure 2:
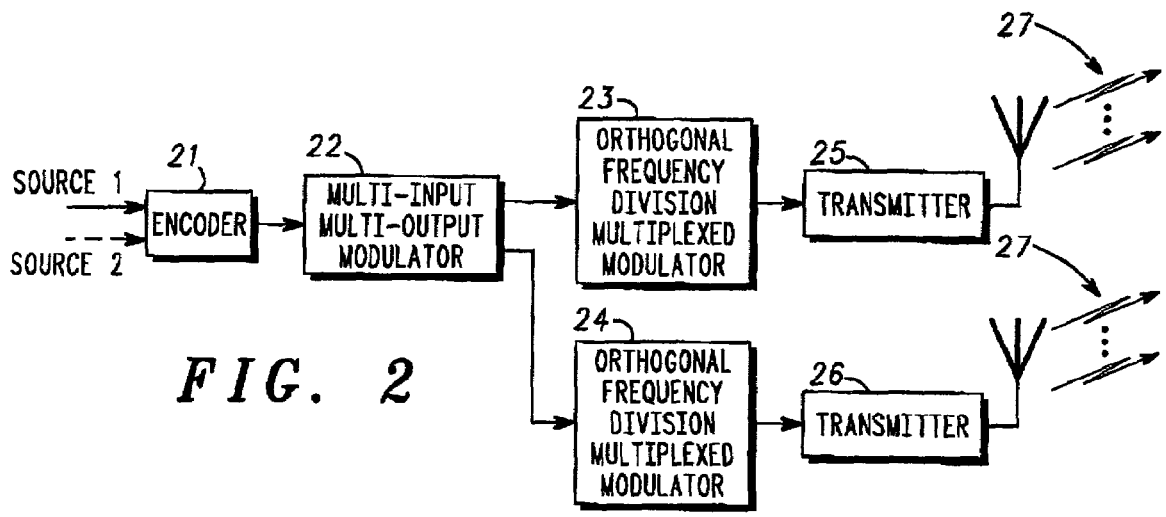
FIG. 2 comprises a block diagram depiction of various embodiments for effecting transmission in accordance with the invention.

FIG. 2 depicts a transmission apparatus for effecting the above process. An encoder 21 receives a datastream of bits from a first source (source 1). In an alternative embodiment, the encoder 21 receives datastreams from multiple sources, such as, for example, a second source (source 2). The encoder 21 encodes the bits pursuant to whatever coding scheme is selected (specific examples are provided below) with the encoder 21 providing a single datastream output (regardless of the number of incoming datastreams).

The encoded bits output of the encoder 21 feeds a multiple-input multiple-output modulator 22 (although a MIMO modulator traditionally receives multiple inputs, in this embodiment, only the one datastream couples to the MIMO modulator 22 input). As disclosed in more detail below, the MIMO modulator 22 serves as a serial to parallel mechanism that distributes the incoming bits to multiple outputs of the MIMO modulator (or, in the case where the bits are mapped to corresponding symbols, that distributes the symbols to multiple outputs). In this case, the multiple outputs of the MIMO modulator couple to orthogonal frequency division multiplexed modulators 23 and 24 where the various bits (or symbols) are processed in accordance with existing OFDM techniques and provided to a corresponding OFDM transmitter 25 or 26 which each transmits simultaneously on a shared set of subcarriers 27 (the number of subcarriers will vary with available total bandwidth, desired subcarrier bandwidth, and other factors and requirements as vary from application to application). The signal transmitted from a plurality of antennas in such a way is referred to as multi-antenna transmission signal.

So configured, the transmission apparatus just described can effect the early described process and thereby successfully interleave information representing an original signal datastream across the subcarriers 27 and transmitters 25 and 26.

Figure 3:
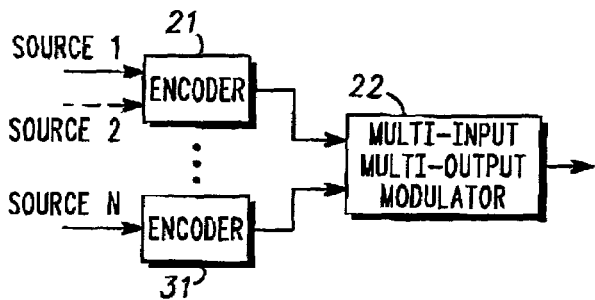
FIG. 3 comprises a detailed block diagram depiction of an alternative embodiment as pertains to effecting transmission in accordance with the invention.

As mentioned earlier, although a single datastream is ultimately interleaved over the selected transmission resources by the multi-input multi-output modulator, information from more than one information source can be so processed. For example, with reference to FIG. 3, a single encoder 21 can receive inputs from multiple sources and mix and combine these inputs to provide a single datastream output to the MIMO modulator 22. In the alternative, or in addition, additional encoders 31 can be used to independently code information from other sources. So configured, the MIMO modulator 22 receives a plurality of inputs and processes these multiple inputs together to yield the same interleaving effects and advantages as described above (that is, the encoded datastream is interleaved across both transmitters and subcarriers).

Figure 4:
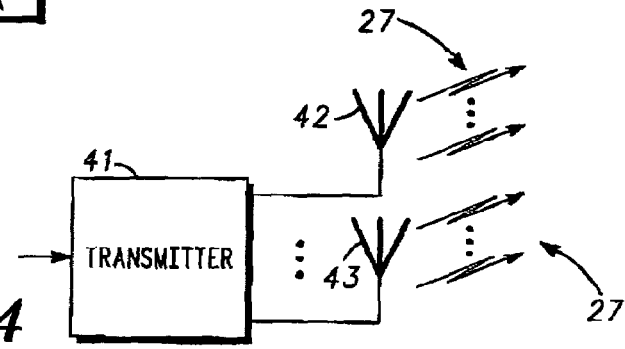
FIG. 4 comprises a detailed block diagram depiction of an alternative embodiment as pertains to effecting transmission in accordance with the invention.

It has also been mentioned earlier that one or more of the OFDM transmitters 25 or 26 can have multiple antennas (along with a corresponding circuit chain for each antenna). As depicted in FIG. 4, such a transmitter 41 can have a first antenna 42, and second antenna 43, and any number of additional antennas as may be desired. Just as the multiple transmitters 25 and 26 utilize the same channel and hence the same subcarriers 27, so too do the multiple antennas 42 and 43 transmit these same subcarriers 27. Again as noted above, when configured with multiple antennas as depicted in FIG. 4, the information to be transmitted (bits or symbols) can be interleaved over the subcarriers, the transmitters, and the antennas (for example, a given symbol can be assigned a specific subcarrier as broadcast by a specific transmitter using a specific antenna while a second symbol can be assigned a different subcarrier and/or transmitter and/or antenna).

Figure 5:
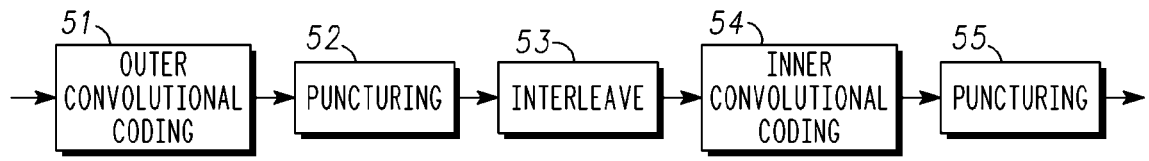
FIG. 5 comprises a detailed block diagram depiction of a particular embodiment for effecting encoding.

As described above, the bits comprising the datastream can be coded prior to being interleaved. There are various ways to accomplish such encoding. Typically, convolutional encoding, a well understood coding technique, works well. Another type of coding, parallel concatenated convolutional encoding, can be used as appropriate, as well. A preferred embodiment, at least for some applications, uses serially concatenated convolutional encoding. Both parallel and serial concatenated convolutional codes are sometimes referred to as turbo codes. As an example of serial concatenated convolutional codes, and referring to FIG. 5, the datastream bits can be convolutionally coded 51 and then punctured 52 to reduce the number of resultant bits. The resulting bits can then be interleaved 53 and then convolutionally encoded 54 again to yield a serially concatenated convolutionally encoded datastream. This datastream is again punctured 55 to reduce the number of bits.

Since block-wise processing is used in OFDM, the interleaver 53 used in serially concatenated convolutional encoding should not incur any appreciable additional delay as long as the coding is limited to one OFDM block. Turbo-like codes are especially suitable to data-oriented packet services.

The inner code 54 should preferably be a convolutional recursive code to guarantee an interleaver gain (the interleaver gain is referred to as the quantity $M^\alpha$ at the maximum $\alpha_{max}$ where M is the block size of the bits that will be interleaved). The outer code 51 can be a non-recursive code with the free distance as large as possible. One reason for a recursive inner code 54 is that the minimum weight of input sequences generating error events is 2, rather than 1 in the case of non-recursive codes. Consequently, an input sequence of weight I can generate at most $\lfloor I/2 \rfloor$ error events (where $\lfloor n \rfloor$ means the largest integer less than or equal to n). The expression for the bit-error probability upper bound is a summation of many terms, each of which has a coefficient of the form $M^\alpha$ for a uniform interleaver of M bits. To ensure an interleaver gain, the exponent $\alpha$ is desired to always be negative, which is the case if a recursive inner code is used.

In the recursive inner code case, $\alpha_{max} = -\lceil d_f^o/2 \rceil$ ($\lceil n \rceil$ means the smallest integer less than or equal to n), where $d_f^o$ is the free distance of the outer convolutional code. That leads to a second design criterion for a preferred embodiment, which is that the outer code should have a large $d_f^o$. Also, the maximum input weight yielding output weight $d_f^o$ should be minimized, as well as the number of such inputs. Therefore, it is convenient to choose a nonrecursive code for the outer code.

Also, in addition to being recursive, the inner code should have a maximum effective free distance, i.e., the minimum weight of codewords generated by weight-2 inputs. Numerous prior art codes are suitable for such criteria of choosing the outer and inner code because they provide the maximum free distance among all codes searched in the same category.

In one embodiment, the inner code is a rate ½ 8-state recursive code with $G(D)=[1,(1+D+D^2+D^3)/(1+D+D^3)]$ and the outer code is a non-recursive rate ½ 8-state code with $G(D)=[1+D+D^3, 1+D+D^2+D^3]$. Also, the internal interleaver may be a random uniform interleaver, a so-called S-random interleaver, as well as any other type of interleaver known in the art.

Figure 6:
FIG. 6 comprises a detailed block diagram depiction of a particular embodiment for effecting MIMO modulation.
Figure 7:
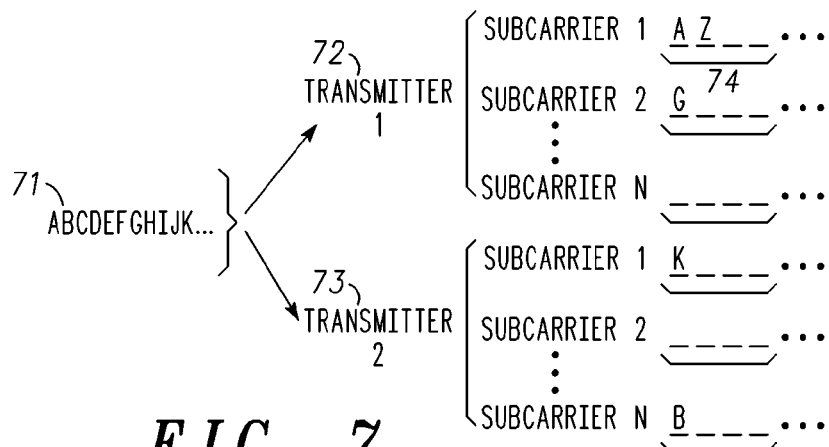
FIG. 7 comprises an illustrative depiction of bit interleaving in accordance with various embodiments of the invention.

Also as described above, the resultant encoded bits are interleaved across the transmission resources (subcarriers and antennas) and mapped, if desired, to symbols for transmission. Referring to FIG. 6, this bit interleaving 61 occurs across at least the subcarriers and antennas. Referring momentarily to FIG. 7, this bit interleaving 61 will be described within the context of a simple illustrative example. In this example, the datastream is represented as a series of letters from "A" to "K" and beyond (the datastream will ordinarily be represented by binary characters of course, but the alphabetic characters are used here for purposes of clarity, and, of course the length of the incoming datastream 71 is not ordinarily limited to the 26 alphabetical letters; ordinarily the length can be in the thousands). These datastream elements are interleaved over the transmitters (in this example there is a transmitter 1 denoted by reference numeral 72 and a transmitter 2 denoted by a reference numeral 73) and the subcarriers that comprise the channel (in this example there are N subcarriers). Pursuant to this example, a first datastream element "A" is assigned to transmitter 1/subcarrier 1. The next adjacent datastream element "B" is assigned to transmitter 2/subcarrier N, and so forth. Importantly, this interleaving effects a substantially minimized correlation among the subcarriers/antennas on which a block of adjacent information components as assigned will be transmitted. The subcarrier correlation among the block of bits is minimal as compared to their pre-assignment adjacent status. For example, as illustrated, the next information component assigned to transmitter 1/subcarrier 1 is "Z" whereas in the original datastream "A" and "Z" are greatly separated; the point is that datastream components that are relatively proximal to one another in the original datastream are interleaved to be substantially distal from one another with respect to both transmitter and subchannel (and antenna if that resource is available) and vice versa. Encoded consecutive bits out of an encoder will have correlation among them due to the convolutional process of the encoder. Here, the bits (or symbols) are assigned onto different resources with minimal correlation to effectively combat the chances that a portion of the resources are not good due to multipath fading propagation. By interleaving the datastream components to effect minimal component proximity correlation as compared to the original order of the datastream in this way, data throughput becomes quite robust and significantly resistant to numerous kinds of channel disruptions.

As datastream bits are assigned to specific transmitters and subcarriers as described above, groups 74 of bits as assigned to a specific transmitter/subcarrier can be mapped to a symbol in accordance with well understood prior art technique. In the example depicted in FIG. 7, each group 74 of four consecutive bits is mapped to a single representative symbol. Various symbol mapping strategies are known and usable in this application, including but not limited to QPSK, 16-QAM, and so forth.

As a general principle and in a preferred embodiment, adjacent encoded bits are interleaved to different antennas and on adequately uncorrelated subcarriers so that a maximum amount of spatial and frequency diversity can be exploited. The actual achieved diversity order is dependent on the Hamming weight of the coded sequence. (Note that unlike the internal interleaver (53 in FIG. 5) in the serially concatenated convolutional encoding process, the bit-interleaver preceding the symbol mapping (61 in FIG. 6) essentially serves to exploit diversity.)

Figure 8:
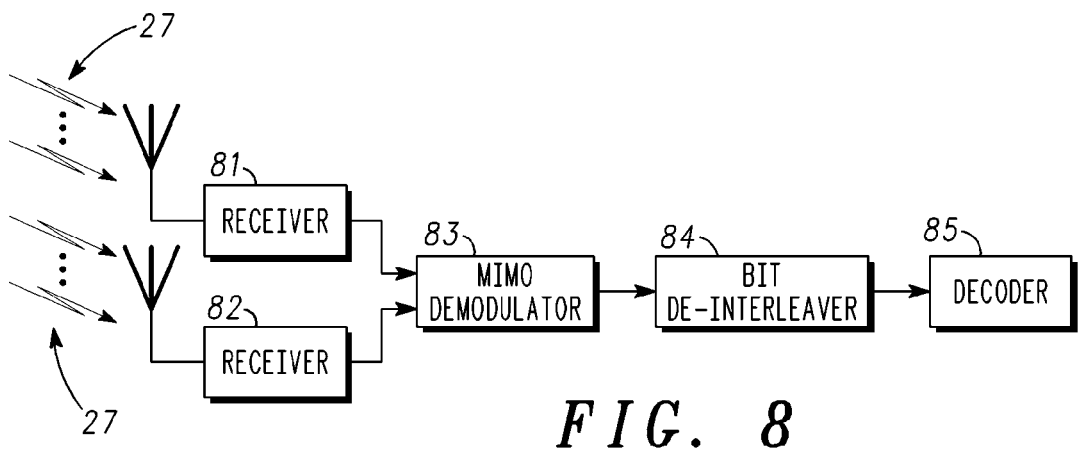
FIG. 8 comprises a block diagram depiction of a receiver configured in accordance with an embodiment of the invention.

For a general viewpoint, reception of the above signals essentially comprises the reverse set of operations. With reference to FIG. 8, the data on the subcarriers 27 are transmitted by the transmitters 25 and 26, filtered by the channel, and received by corresponding receivers 81 and 82 (as shown, each receiver has one antenna—additional antennas can be used as desired to achieve diversity/selectivity in accordance with well understood prior art technique). The receivers 81 and 82 are coupled to a MIMO demodulator 83 and a bit de-interleaver 84 that process the received data (including converting the metric for received symbols into corresponding bit metrics when symbols have been used during transmission) and reconstructs the original encoded datastream. This encoded datastream feeds a decoder 85 to provide the original information (pre-encoded) datastream.

The MIMO demodulator 83 and bit-deinterleaver 84 supply bit soft information to the decoder 85. The bit soft information represents the a priori probabilities of data conditioned on that bit being 0 or 1. Note that the received data at each subcarrier by each receiver is the contribution of multiple symbols as transmitted by the number of transmitters simultaneously using that subcarrier. Various MIMO algorithms, with different complexity, can be used in demodulator 83 to supply the soft information to the decoder 85.

Before presenting the MIMO demodulator 83, the decoder 85 is first described. A serially concatenated convolutional encoding is decoded in an iterative fashion, similar to the decoding of a parallel concatenated convolutional code. It is the similar iterative decoding process used by both the serially and parallel concatenated convolutional code that gives such codes the name "turbo" codes. The turbo-like decoding procedure is believed to be able to converge to the maximum likelihood solution. One contributing factor to iterative decoding is the exchange of soft extrinsic information between constituent decoders and between two adjacent iterations. For parallel concatenated convolutional encoding, all the constituent decoders have the same, though interleaved, information bit sequence at their inputs. Therefore, only soft information on the information bits needs to be exchanged. However for serially concatenated convolutional encoding, soft information on the input bits of the inner code is used as the a prior information on the output (coded) bits of the outer code (refer to FIG. 5). Therefore, unlike parallel concatenated convolutional encoding, the extrinsic information on both the input and output bits of the inner code may be needed. Although the MAP algorithm commonly used in parallel concatenated convolutional encoding can be modified for that purpose, a more generic MAP algorithm known as soft-input soft-output (SISO) a posteriori probability (APP) module can be used.

The APP module can be a four-port device whose two inputs are two sequences of probabilities $\{P_n(c;I)\}$ and $\{P_n(u;I)\}$, and whose outputs are another two sequences of probabilities $\{P_n(c;O)\}$ and $\{P_n(u;O)\}$, where I and O denote the input and output of the APP module, respectively and $\{P_n\}$ denotes a sequence consisting of probability values $P_n$. Notation u and c denote the input and output symbols of a convolutional encoder, respectively, and $\{U_n\}$ and $\{C_n\}$ will denote the input and output symbol sequences. Here an input (output) symbol of the APP module refers to the block of bits involved in each trellis branch, not the actual transmitted symbol. (Note that the input and output of the encoder (u and c) are different from those of the APP module (I and O).) If the APP inputs are $$P_n(u;I) \propto P(U_n=u),$$

$$P_n(c;I) \propto P(y_n|C_n=c) \quad (1)$$

it can be shown that the APP outputs are (where $\propto$ means "is proportional to")

$$P_n(u;O) \propto P(y_1^N|U_n=u),$$

$$P_n(c;O) \propto P(y_1^N|C_n=c) \quad (2)$$

where $y_1^N$ denotes the entire received data sequence (i.e., $y_n$ from n=1 to N). Note that $P_n(u;I)$ and $P_n(c;I)$ are probabilities unconstrained by the code structure. The output quantities, which can be used as the extrinsic information, are probabilities constrained by the code structure. The a posteriori probability, which will be used for making decisions after the final iteration, is $$P(U_n=u|y_1^N) \propto P_n(u;O) P_n(u;I). \quad (3)$$

The SISO APP module works in a way very similar to that of a turbo code MAP algorithm, i.e., the probabilities $P_n(u;O)$ and $P_k(c;O)$ can be computed after obtaining some quantities $\alpha_k$ and $\beta_k$ through the forward and backward recursion. The APP module can be implemented in the log domain using computation kernels such as max* and avg*.

In one embodiment where a turbo decoder 85 is used, the MIMO demodulator 83 and bit de-interleaver 84 need to provide the decoder 85 with the soft decisions based on probabilities $P(y_k|b_i)$ for each coded bit $b_i$, where $y_k$ is the received data vector at subcarrier k that $b_i$ is sent on. At each OFDM subcarrier $$y_k = H_k s_k + n_k, \quad (4)$$

where $H_k$ is an $M_R$-by-$M_T$ channel matrix at subcarrier index k and $s_k$ is a length-$M_T$ symbol vector. Several MIMO algorithms that yield $P(y_k|b_i)$ can be considered for use.

A. Maximum Likelihood (ML) Receiver

For a modulation of order $Q=2^q$, there are $Q^{M_T}$ possibilities for $s_k$, each being associated with a $P(y_k|s_k)$. For each bit $b_{i,k}$ concerned ($i=1\ldots qM_T$) at subcarrier-k, after defining a set of $Q^{M_T}/2$ symbols $S_{i,+} = \{s|b_i=1\}$, $P(y_k|b_{i,k})$ can be computed as $$P(y_k|b_{i,k}=1) = \Sigma_{s \in S_{i,+}} P(y_k|s_k=s) P(s_k=s). \quad (5)$$

Similarly, one can define the set $S_{i,-} = \{s|b_i=0\}$ and compute $P(y_k|b_{i,k}=0)$. Without any prior knowledge of the coded bits, each s in $S_{i,+}$ is assumed equally probable initially in (5).

In this MIMO demodulator algorithm, rather than making hard decisions (0 or 1), soft bit decisions based on $P(y_k|b_{i,k})$ are the values that are passed to the APP constituent decoder of the decoder 85. One drawback of a maximum likelihood receiver is exponential complexity due to the computation of $P(y_k|s_k)$ for each of the $Q^{M_T}$ possible $s_k$, which limits the usage to the cases of small Q and $M_T$.

B. Zero Forcing (ZF) Filtering

To avoid the complexity of the maximum likelihood receiver, linear filtering can be used to first separately estimate the $M_T$ signals ($\hat{s}_1, \ldots, \hat{s}_{M_T}$) of each transmit antenna and then compute $P(\hat{s}_{j,k}|b_{i,k})$ for $j=1 \ldots M_T$. Note that for modulation order $q>1$, the bit probability is still computed based on the symbol probability similar to (5), although the set $S_{i,+}$ ($S_{i,-}$) is much smaller here (size Q/2 instead of $Q^{M_T}/2$). A zero forcing filter is simply ("+" denotes pseudo-inverse)

$$W_k = H_k^+, \quad (6)$$

which is applied to the data vector as $$\hat{s}_k = [\hat{s}_{1,k}, \ldots, \hat{s}_{M_T,k}]^T = W_k^H y_k. \quad (7)$$

Such linear filtering affects the noise, which should preferably be accounted for in the computation of $P(\hat{s}_{j,k}|s_{j,k})$ (for $j=1 \ldots M_T$). For example, the effective noise, though still Gaussian, has a variance of $\|W_k(:,j)\|^2 \sigma_n^2$, where $W_k(:,j)$ denotes the $j^{th}$ column of the matrix $W_k$ and "$\|.\|$" denotes the vector norm. So the log-likelihood of for a constellation symbol (say $s_0$), also referred to as the symbol metric, is ("ln" being the natural logarithm)

$$\ln(P(\hat{s}_{j,k}|s_{j,k}=s_0)) = -|\hat{s}_{j,k}-s_0|^2/(2\|W_k(:,j)\|^2 \sigma_n^2). \quad (8)$$

C. Minimum Mean Squared Error (MMSE) Filtering

An MMSE filter trades off interference suppression for less noise enhancement. The MMSE filter matrix is $$W_k = (H_k H_k^H + \sigma_n^2 I)^{-1} H_k. \quad (9)$$

If MMSE filtering is used, the symbol estimate contains not only the filtered noise, but also residual interference from signals sent on other antennas. As an approximation, the residual interference can be modeled as Gaussian noise with an effective variance of $\|H_k^H W_k(:,j) - e_j\|^2 \sigma_s^2$, where $e_j$ is a vector whose only nonzero entry 1 is at the $j^{th}$ position and $\sigma_s^2$ is the average symbol power. Residual interference can also be assumed to be independent from the additive noise, in which case, the total effective noise power is the sum of these two. So the log-likelihood soft information for a symbol ($s_0$) can be computed as $$\ln(P(\hat{s}_{j,k}|s_{j,k}=s_0)) = -|\hat{s}_{j,k}-s_0|^2/(2\|W_k(:,j)\|^2 \sigma_n^2 + 2\|H_k^H W_k(:,j) - e_j\|^2 \sigma_s^2), \quad (10)$$

The gain of accounting for the residual interference power can be very significant.

Preferably, especially with higher order modulation such as 16-QAM, one may scale each row of $W_k^H$ so that the diagonal elements of $W_k^H H_k$ equal 1. The reason is that the MMSE filters are designed to give an estimate with a minimum mean squared error. Scaling of the estimates may happen in order to reduce noise enhancement. Here, however, one is more concerned with the likelihood information than the mean squared error. A filter with a large norm may greatly amplify the noise and result in a large mean squared error, but this information would be deemed highly unreliable anyway since the value of equation (8) and (10) would be small due to the large effective noise power. The above normalization amounts to restoring the symbol as close to the constellation as possible, while leaving noise enhancement as a secondary concern. Note that the normalization should preferably precede the computation of residual interference power.

D. Maximum SINR Filtering

In light of the above discussion, it appears that for linear filtering, what actually dictates the decoded performance is the Signal to Interference and Noise Ratio (SINR). Thus, it makes sense to use the maximum SINR criterion. To recover symbol stream j, one must identify the filter $w_j$ that satisfies $$w_j = \arg\max_w \frac{w^H(:,j) H(:,j)^H w}{w^H \left( \sum_{l \neq j} H(:,l) H(:,l)^H + \sigma_n^2 I \right) w}, \quad (11)$$

(the subcarrier index k has been omitted for clarity). The solution is the eigenvector corresponding to the non-zero eigenvalue of the rank-1 matrix $$(\Sigma_{l \neq j} H(:,l) H(:,l)^H + \sigma_n^2 I)^{-1} H(:,j) H(:,j)^H. \quad (12)$$

Since the SINR is the same if the solution of equation (11) is scaled by an arbitrary complex number, proper normalization as described previously is also appropriate here. Moreover, the maximum SINR solution also causes residual interference whose power can be easily derived and then accounted for in the log-likelihood computation.

Various transmission and reception methods and apparatus have been set forth to depict various ways to interleave a datastream across multiple transmitters and subcarriers (and antennas when available) and then recover the original datastream upon reception. Those skilled in the art will recognize that other modifications, combinations, and alterations can be made as well without departing from the spirit and scope of the invention set forth. Such modifications, combinations, and alterations are therefore to be considered as within the scope of the invention.

We claim:

1. A method of transmitting data comprising:
providing a datastream comprised of bits;
interleaving the bits of the datastream across a plurality of orthogonal frequency division multiplexed radio frequency transmitters, wherein each of the radio frequency transmitters transmits a plurality of radio frequency subcarriers, to provide interleaved bits wherein consecutive interleaved bits are grouped and mapped to symbols and the symbols assigned for transmission such that adjacent datastream bits are assigned to differing transmitters and differing subcarriers with low channel response correlation to thereby exploit an increased amount of spatial and frequency diversity;

transmitting the symbols using the plurality of radio frequency subcarriers of the plurality of orthogonal frequency division multiplexed radio frequency transmitters wherein assigning symbols such that adjacent datastream bits are assigned to differing transmitters and differing subcarriers with low channel response correlation further comprises assigning symbols such that adjacent datastream bits out of each encoder when multiple encoders are used are assigned to differing transmitters and different subcarriers with low channel response correlation to thereby exploit an increased amount of spatial and frequency diversity for each encoded datastream.

2. The method of claim 1 wherein providing a datastream comprised of bits includes providing a datastream comprised of bits as provided from a single source.

3. The method of claim 1 wherein providing a datastream comprised of bits includes providing a datastream comprised of bits as provided from a plurality of sources.

4. The method of claim 3 wherein providing a datastream comprised of bits as provided from a plurality of sources includes providing a datastream comprised of bits as provided from a plurality of sources wherein at least some of the bits as provided from at least one of the plurality of sources are encoded bits.

5. The method of claim 1 wherein providing a datastream comprised of bits includes providing a datastream comprised of encoded bits.

6. The method of claim 5 wherein providing a datastream comprised of encoded bits includes providing a datastream comprised of convolutionally encoded bits.

7. The method of claim 5 wherein providing a datastream comprised of encoded bits includes providing a datastream comprised of serially concatenated convolutionally encoded bits.

8. The method of claim 5 wherein providing a datastream comprised of encoded bits includes providing a datastream comprised of parallel concatenated convolutionally encoded bits.

9. A method of receiving data comprising:
using at least one orthogonal frequency division multiplexed transmission receiver having at least one antenna to receive multi-antenna transmission signals across a plurality of subcarriers;
demodulating the received multi-antenna transmission signals to recover data bits from bit metrics computed by using a maximum likelihood bit soft information estimator represented by $$P(y_k | b_{i,k}) = \sum_{s \in S_i} P(y_k | s_k = s) P(s_k = s)$$

where $P(y_k|b_{i,k})$ is a probability of observing received signals $y_k$ at the $k^{th}$ subcarrier on at least one antenna under the condition of transmitting bit $b_{i,k}$ (0 or 1), and $S_i$ is a set of all symbol vectors whose bit representations contain the given value of the bit of interest $b_{i,k}$.

10. A method of receiving data comprising:
using at least one orthogonal frequency division multiplexed transmission receiver having at least one antenna to receive multi-antenna transmission signals across a plurality of subcarriers;
demodulating the received multi-antenna transmission signals to recover data bits from bit metrics computed by using a zero forcing bit metric estimator represented by $$P(\hat{s}_{j,k} | b_{i,k}) = \sum_{s_0 \in S_i} \exp[-|\hat{s}_{j,k} - s_0|^2 / (2\|W_k(:,j)\|^2 \sigma_n^2)] P(\hat{s}_{j,k} = s_0)$$

where $\hat{s}_{j,k}$ is the estimated symbol at the $k^{th}$ subcarrier of the $j^{th}$ transmitted antenna, i.e. $[\hat{s}_{1,k}, \ldots, \hat{s}_{MT,k}]^T = W_k^H y_k$, with the filter matrix $W_k$ being the zero forcing matrix computed based on the channel matrix $H_k$, and where $W_k(:,j)$ denotes the $j^{th}$ column of $W_k$, "$\|.\|$" denotes the vector norm, $\sigma_n^2$ is the noise power, and $S_i$ is a set of constellation symbols whose bit representations contain the given value of the bit of interest $b_{i,k}$.

11. A method of receiving data comprising:
using at least one orthogonal frequency division multiplexed transmission receiver having at least one antenna to receive multi-antenna transmission signals across a plurality of subcarriers;
demodulating the received multi-antenna transmission signals to recover data bits from bit metrics computed by using a minimum mean squared error bit metric estimator represented by $$P(\hat{s}_{j,k} | b_{i,k}) = \sum_{s_0 \in S_i} \exp\left[-|\hat{s}_{j,k} - s_0|^2 / (2\|W_k(:,j)\|^2 \sigma_n^2 + 2\|H_k^H W_k(:,j) - e_j\|^2 \sigma_s^2)\right]$$

$$P(\hat{s}_{j,k} = s_0)$$

where $\hat{s}_{j,k}$ is the estimated symbol at the $k^{th}$ subcarrier of the $j^{th}$ transmitted antenna, i.e. $[\hat{s}_{1,k}, \ldots, \hat{s}_{MT,k}]^T = W_k^H y_k$, with the filter matrix $W_k$ being the minimum mean squared error matrix computed based on the channel matrix $H_k$ (scale each row of $W_k^H$ so that the diagonal elements of $W_k^H H_k$ equal 1), and where $W_k(:,j)$ denotes the $j^{th}$ column of $W_k$, "$\|.\|$" denotes the vector norm, $\sigma_n^2$ denotes the noise power, $e_j$ is a vector whose only nonzero entry 1 is at the $j^{th}$ position, $\sigma_s^2$ is the average symbol power, and $S_i$ is a set of contellation symbols whose bit representations contain the given value of the bit of interest $b_{i,k}$.

12. A method of receiving data comprising:
substantially simultaneously:
using a first orthogonal frequency division multiplexed transmission receiver having at least one antenna to receive multi-antenna transmission signal across a plurality of subcarriers to obtain first modulation items;
using a second orthogonal frequency division multiplexed transmission receiver having at least one antenna to receive multi-antenna transmission signal across a plurality of subcarriers to obtain second modulation items, wherein the plurality of subcarriers are substantially identical for both the first and second receiver;
demodulating the radio frequency transmissions as received by the first and second receivers to recover a single stream of data comprised of bits that are recovered from both the first and second modulation items, wherein demodulation includes the use of a zero forcing symbol metric estimator based on ("ln" stands for the natural logarithm)

$$\ln P(\hat{s}_{j,k} \mid s_0) = -|\hat{s}_{j,k} - s_0|^2 / (2\|W_k(:,j)\|^2 \sigma_n^2)$$

where $\hat{s}_{j,k}$ is the estimated symbol at the $k^{th}$ subcarrier of the $j^{th}$ transmitted antenna, i.e. $[\hat{s}_{1,k}, \ldots, \hat{s}_{MT,k}]^T = W_k^H y_k$, with the filter matrix $W_k$ being the zero forcing matrix computed based on the channel matrix $H_k$, and where $W_k(:,j)$ denotes the $j^{th}$ column of $W_k$, "$\|.\|$" denotes the vector norm, $\sigma_n^2$ is the noise power, and $s_0$ is any of the constellation symbols.

13. A method of receiving data comprising:
substantially simultaneously:
using a first orthogonal frequency division multiplexed transmission receiver having at least one antenna to receive radio frequency transmissions across a plurality of subcarriers to obtain first modulation items;
using a second orthogonal frequency division multiplexed transmission receiver having at least one antenna to receive radio frequency transmissions across a plurality of subcarriers to obtain second modulation items, wherein the plurality of subcarriers are substantially identical for both the first and second receiver;
demodulating the radio frequency transmissions as received by the first and second receivers to recover a single stream of data comprised of bits that are recovered from both the first and second modulation items, wherein demodulation includes the use of a minimum mean squared error symbol metric estimator based on ("ln" stands for the natural logarithm)

$$\ln P(\hat{s}_{j,k} \mid s_0) = -|\hat{s}_{j,k} - s_0|^2 / \left(2\|W_k(:,j)\|^2 \sigma_n^2 + 2\|H_k^H W_k(:,j) - e_j\|^2 \sigma_s^2\right)$$

where $\hat{s}_{j,k}$ is the estimated symbol at the $k^{th}$ subcarrier of the $j^{th}$ transmitted antenna, i.e. $[\hat{s}_{1,k}, \ldots, \hat{s}_{MT,k}]^T = W_k^H y_k$, with the filter matrix $W_k$ being the minimum mean squared error matrix computed based on the channel matrix $H_k$ (scale each row of $W_k^H$ so that the diagonal elements of $W_k^H H_k$ equal 1), and where $W_k(:,j)$ denotes the $j^{th}$ column of $W_k$, "$\|.\|$" denotes the vector norm, $\sigma_n^2$ denotes the noise power, $e_j$ is a vector whose only nonzero entry 1 is at the $j^{th}$ position,
$\sigma_s^2$ is the average symbol power, and $s_0$ is any of the constellation symbols.

\* \* \* \* \*